United States Patent
Van Kaam

(10) Patent No.: US 8,783,760 B2
(45) Date of Patent: Jul. 22, 2014

(54) SUSPENSION STRUT TOWER BRACE

(71) Applicant: Toyota Motor Engineering & Manufacturing North America, Inc., Erlanger, KY (US)

(72) Inventor: George J. Van Kaam, Union City, CA (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 13/660,070

(22) Filed: Oct. 25, 2012

(65) Prior Publication Data

US 2014/0117718 A1    May 1, 2014

(51) Int. Cl.
B62D 25/08    (2006.01)

(52) U.S. Cl.
CPC .................. B62D 25/082 (2013.01)
USPC ................. 296/203.02; 296/192

(58) Field of Classification Search
CPC ..... B62D 25/08; B62D 25/082; B62D 25/145
USPC ................ 296/192, 203.01, 203.02, 193.09
See application file for complete search history.

(56) References Cited

U.S. PATENT DOCUMENTS

| | | | | |
|---|---|---|---|---|
| 1,834,529 | A * | 12/1931 | Ledwinka | 296/192 |
| 1,855,429 | A * | 4/1932 | Toncray | 296/192 |
| 2,092,542 | A * | 9/1937 | Widman | 296/192 |
| 4,542,934 | A * | 9/1985 | Komatsu et al. | 296/203.02 |
| 4,729,156 | A | 3/1988 | Norris, Jr. et al. | |
| 5,417,470 | A | 5/1995 | Holt | |
| 7,140,674 | B2 * | 11/2006 | Miyoshi et al. | 296/203.03 |
| 7,267,394 | B1 | 9/2007 | Mouch et al. | |
| 7,404,596 | B2 | 7/2008 | Miyata et al. | |
| 7,762,568 | B2 | 7/2010 | Tatsumi et al. | |
| 8,393,673 | B2 * | 3/2013 | Terada et al. | 296/193.09 |
| 8,534,411 | B2 * | 9/2013 | Hirai | 180/300 |

FOREIGN PATENT DOCUMENTS

| | | | |
|---|---|---|---|
| EP | 0845404 | * | 6/1998 |
| JP | 07-267144 | | 10/1995 |
| JP | 11-198853 | | 7/1999 |
| JP | 2007-38850 A | | 2/2007 |
| JP | 2007-45263 A | | 2/2007 |
| JP | 2009-29335 A | | 2/2009 |

* cited by examiner

*Primary Examiner* — Dennis H Pedder
(74) *Attorney, Agent, or Firm* — Christopher G. Darrow; Young Basile Hanlon & MacFarlane P.C.

(57) ABSTRACT

A vehicle suspension strut tower bracing system includes a first suspension strut tower and a second suspension strut tower spaced from the first strut tower. At least one wall extends between and interconnects the first strut tower to the second strut tower. At least one strut tower brace is attached to the wall and spaced from the first and second strut towers. The strut tower brace includes a first support member having a first end and an opposite second end, and a second support member attached to the first support member at location spaced inward from the first and second ends of the first support member. The second support member is arranged at an oblique angle relative to the first support member so as to form a generally Y-shaped configuration.

18 Claims, 3 Drawing Sheets

SUSPENSION STRUT TOWER BRACE

BACKGROUND

An automotive vehicle may employ a suspension system that includes a shock absorber consisting of a piston and cylinder, and a coil spring. The shock absorber may be secured at one end of the piston rod to a shock tower of a vehicle body by way of a strut mounting that operates as an upper support. An opposite end of the shock absorber may be connected at its cylinder portion to a knuckle attached to a hub assembly that rotatably supports a wheel. The coil spring may be disposed around an outer periphery of the piston rod and cylinder, and is generally located between an upper spring seat carried by the strut mounting and a lower spring seat carried by the cylinder. The shock absorber and the coil spring cooperate to cushion the vehicle body from oscillating energy generated by imperfections in the road surface, and help minimized transfer of the oscillatory movements to the vehicle body. The suspension system also operates to stabilize the vehicle when performing cornering maneuvers and to resist buffeting that may occur when encountering crosswinds.

Not all the external forces the vehicle encounters are absorbed by the suspension system and a portion may be transferred to vehicle body. These forces may be transmitted to the vehicle body through the suspension system shock towers and may cause flexing of the vehicle body depending on the magnitude of the force. Suspension loading on the strut towers may, under certain operating conditions, be large enough to cause vehicle body panels to elastically deflect a small amount, which may be mistakenly perceived by a vehicle operator as a slight waver in vehicle tracking.

SUMMARY

The disclosed exemplary embodiments include a vehicle suspension strut tower bracing system having a first suspension strut tower and a second suspension strut tower spaced apart from the first strut tower. At least one wall extends between and interconnects the first strut tower to the second strut tower. At least one strut tower brace is attached to the wall and spaced from the first and second strut towers. The strut tower brace includes a first support member having a first end and an opposite second end, and a second support member attached to the first support member at a location spaced inward from the first and second ends of the first support member. The second support member is arranged at an oblique angle relative to the first support member to provide the strut tower brace with a generally Y-shaped configuration.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
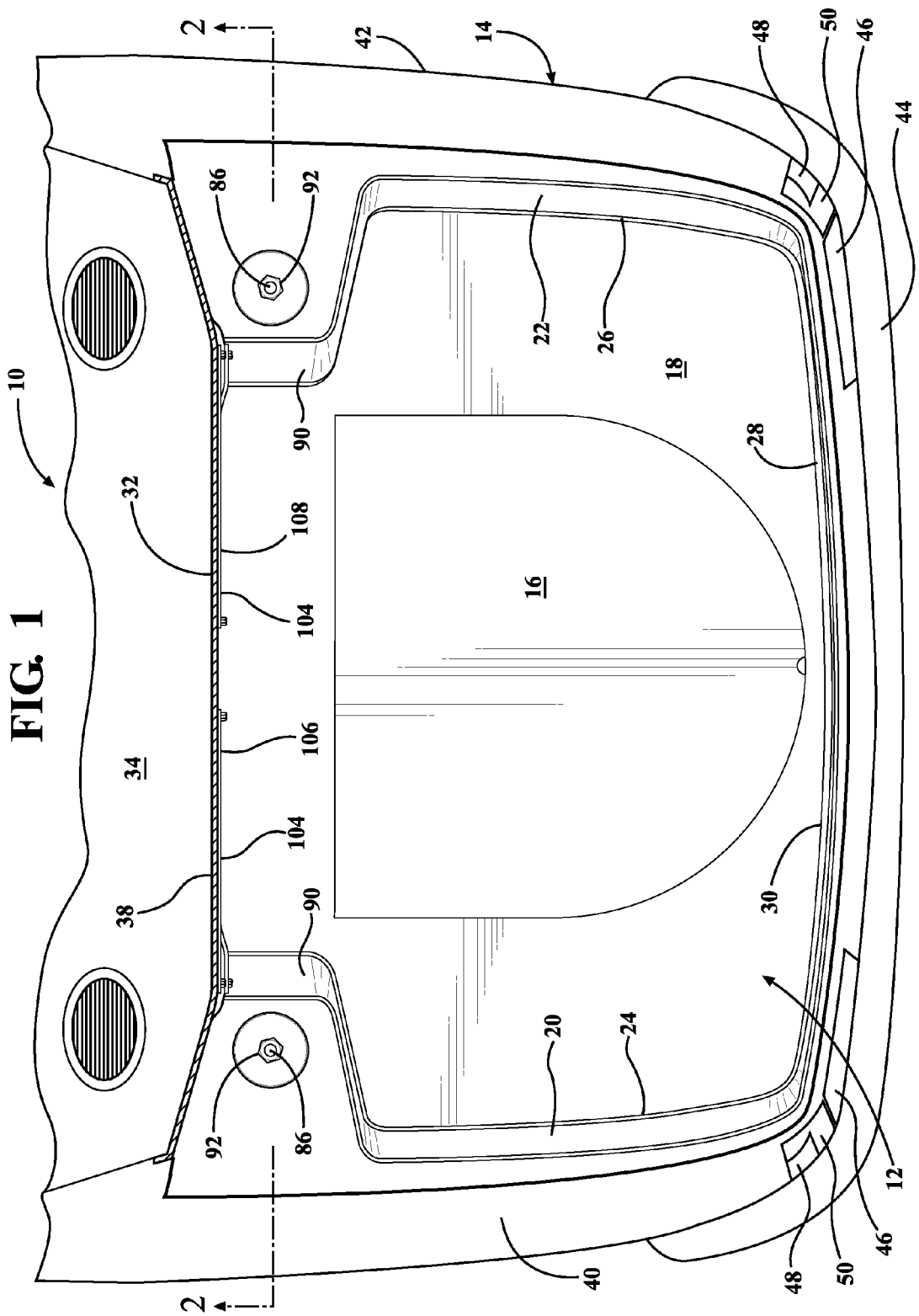
FIG. 1 is a schematic top plan view of a rear portion of an automotive vehicle with a trunk lid removed, illustrating an exemplary strut tower brace for increasing lateral stiffness of a suspension strut tower.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

FIG. 1 is a schematic illustration of a rear portion of an exemplary automotive vehicle 10. Vehicle 10 may include a rear compartment or trunk 12 that may be used for transporting cargo. Compartment 12 is typically enclosed by a hatch or trunk lid pivotally connected to a body 14 of vehicle 10. The hatch or trunk lid may be selectively opened and closed to allow access to rear compartment 12 from outside the vehicle. For purposes of clarity, the hatch and/or trunk lid is not illustrated in FIG. 1.

Figure 2:
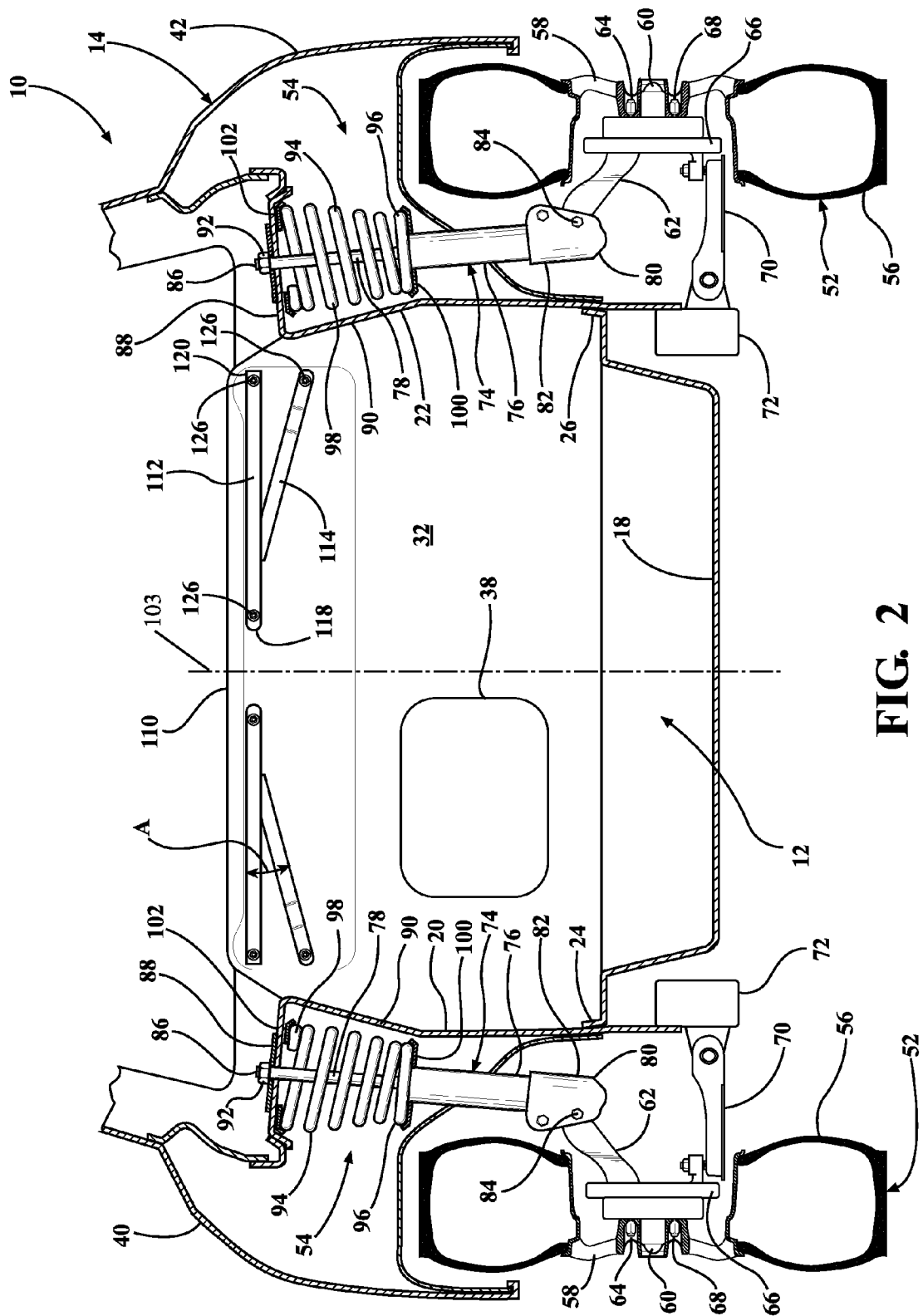
FIG. 2 is a schematic partial sectional view of the vehicle taken along section 2-2 of FIG. 1, illustrating the exemplary strut tower brace.
Figure 3:
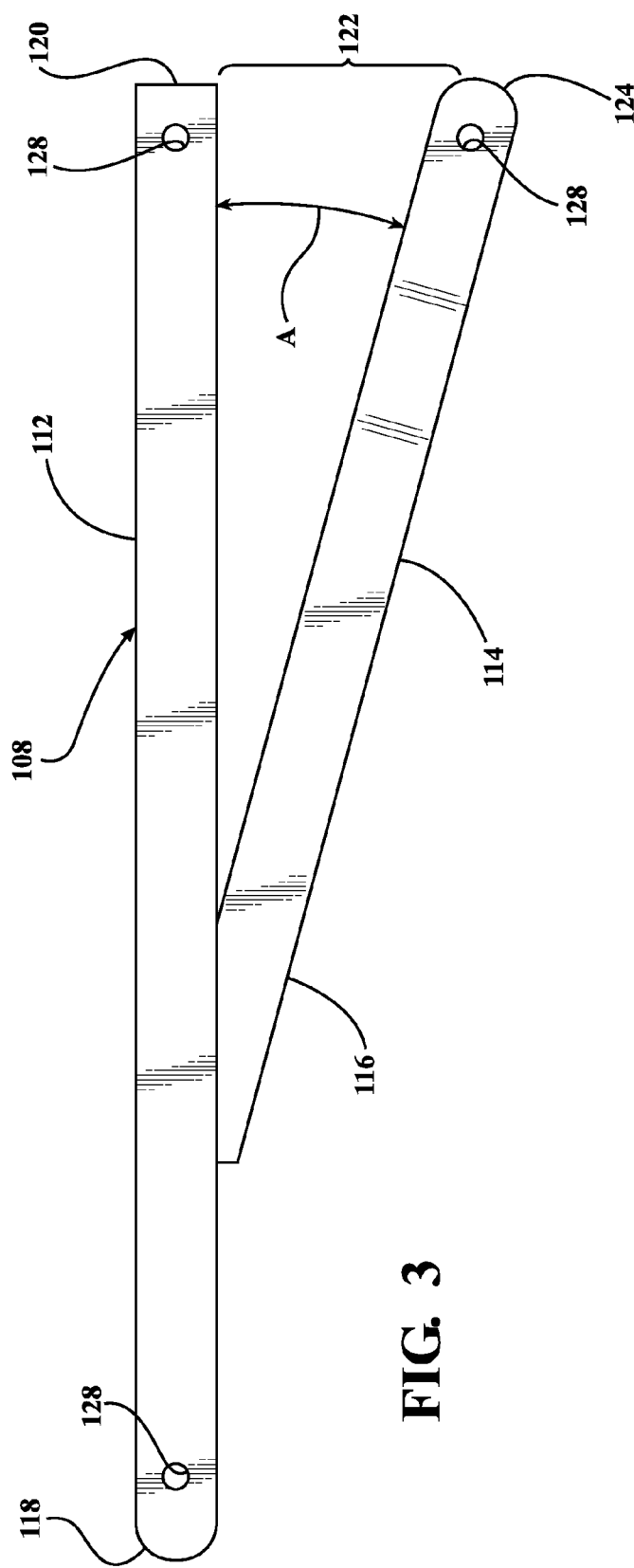
FIG. 3 is a top plan view of the exemplary strut tower brace.
Figure 4:
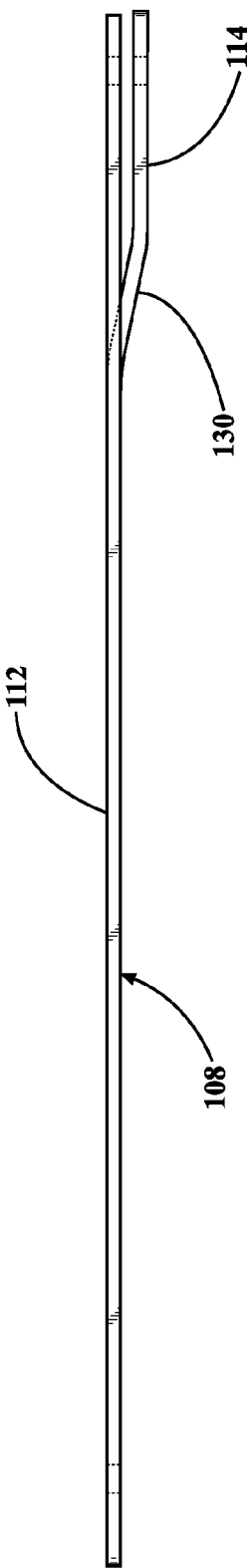
FIG. 4 is a side plan view of the exemplary strut tower brace.

With continued reference to FIG. 1, and also referring to FIG. 2, an interior region or trunk space 16 of rear compartment 12 is at least partially defined by a rear floor panel 18, a left interior side wall 20 and an opposite right interior side wall 22. Floor panel 18 extends across a bottom of rear compartment 12 and provides support for objects present within the rear trunk space. Left interior wall 10 extends upward from a left edge 24 of floor panel 18 and right interior wall 22 extends upward from a right edge 26 of floor panel 18. A rear interior wall 28 extends upward from a rear edge 30 of floor panel 18 and across a rear most end of rear compartment 12 between left and right interior side walls 20 and 22. A front interior wall 32 extends upward from a forward edge of floor panel 18 and between left and right side walls 20 and 22. Front interior wall 32 separates rear compartment 12 from a passenger compartment 34. A rear passenger seat may be arranged adjacent a front surface 36 of front interior wall 32. Front interior wall 32 is disposed between rear compartment 12 and passenger compartment 34.

Front interior wall 32 may be configured as a continuous uninterrupted surface, but may alternatively include one or more access openings 38 for enabling access between rear compartment 12 and passenger compartment 34. Access through opening 38 may be blocked by a seat back of the rear passenger seat, which may extend over the opening. Access through access opening 38 may be enabled by folding down the seat back of the rear passenger seat. Returning the seat back to an upright position blocks access through opening 38 in front interior wall 32.

With continued reference to FIGS. 1 and 2, vehicle body 14 may include an exterior left rear fender 40 arranged outboard and adjacent left interior side wall 20, and an exterior right fender 42 positioned outboard and adjacent right interior side wall 14. Fenders 40 and 42 generally define an exterior contour of vehicle 10. An outer rear fascia 44 extends across a rear most portion of vehicle body 14 adjacent rear interior wall 28. Rear fascia 44 may include a bumper fascia 46 and various mounting fixtures for attaching exterior lighting to vehicle body 14, such as brake lights 48, backup lights 50 and running lights 52. Rear fascia 44 may also include a mounting fixture for attaching and displaying a license plate.

With continued reference to FIGS. 1 and 2, vehicle 10 may include multiple wheels 52 connected to vehicle body 14 through a suspension system 54. Wheels 52 include a tire 56 supported on a rim 58. Suspension system 54 may have any of a variety of configurations. For example, suspension system 54 may include a hub assembly 60 mounted to a knuckle 62. Hub assembly 60 may include a shaft rotatably mounted on one or more bearings. Hub assembly 60 may further include multiple threaded studs 64 for fixedly attaching a brake disc 66 and wheel 52 to the hub assembly. Threaded nuts 68 engagable with studs 64 may be used to secure brake disc 66 and wheel 52 to hub assembly 60. Hub assembly 60 enables brake disc 66 and wheel 52 to rotate concurrently relative to knuckle 62.

A lower control arm 70 pivotally connects knuckle 62 to a vehicle frame member 72. Frame member 72 is attached to and supports vehicle body 14. Knuckle 62 may also be connected to vehicle body 14 through a strut assembly 74 that includes a strut suspension damper 76 having a piston rod 78. A lower proximal end 80 of strut suspension damper 76 may include a bracket 82 for connecting strut assembly 74 to knuckle 62. Strut assembly 74 may be fixedly secured to knuckle 62 using a detachable threaded fastener 84, for example a bolt, or another attachment mechanism, such as welding, brazing and riveting. An opposite distal end 86 of piston rod 78 may be fixedly attached to an upper region 88 of a strut tower 90 formed in vehicle body 14, for example, by a threaded nut 92. Disposed around an outer periphery of suspension damper 76 is a biasing member 94, for example, a coil spring. A lower end 96 and an upper end 98 of biasing member 94 are respectively seated on, and supported by, a lower spring seat 100 carried by housing suspension damper 76 and an upper spring seat 102.

Suspension system 54 operates to absorb shocks caused by bumps and irregularities in a road surface that may be encountered by vehicle 10. Suspension system 54 also helps stabilize the vehicle when performing cornering maneuvers and to resist buffeting that may occur when encountering crosswinds. Not all of the external forces are absorbed by suspension system 54, and a portion may be transmitted to vehicle body 14. This may cause flexing of vehicle body 14 depending on the magnitude of the force. For example, strut assemblies 54 are generally angled inward when viewed from the front or rear of the vehicle. This orientation causes suspension system 54 to exert an upward and inward force on strut towers 90, which tends to deflect the strut towers inward toward a centerline 103 of vehicle 10. The inward deflection of strut towers 90 is at least partially resisted by front interior wall 32, which extends between and interconnects the strut towers. Under certain operating conditions, suspension loading on strut towers 90 may be large enough to cause front interior wall 32 to elastically deflect a small amount, which may be mistakenly perceived by a vehicle operator as a slight waver in vehicle tracking.

With reference to FIGS. 1-4, deflection of front interior wall 32 may be minimized by attaching one or more strut tower braces 104 to front interior wall 32. The exemplary configuration illustrated in the drawing figures employs a pair of strut tower braces, but in practice fewer of more braces may be employed. A left strut tower brace 106 is attached to a left side of front interior wall 32 and a second right strut tower brace 108 is attached to a right side of the front interior panel. Strut tower braces 106 and 108 may be configured to be mirror images of one another, or may each have a different configuration to accommodate the design and performance requirements of a particular application. Strut tower braces 106 and 108 are illustrated in the exemplary configuration as being positioned near a top edge 110 of front interior wall 32, but in practice may be positioned at another location along front interior wall 32.

For purposes of expediency, the configuration of right strut tower brace 108 will be described, but it shall be appreciated that the description is equally applicable to left strut tower brace 106. Strut tower brace 108 may include an elongated first support member 112 oriented generally horizontal to a ground surface when attached to front interior panel 32. An elongated second support member 114 may be fixedly attached to first support member 112 and extends generally downward at an oblique angle "A" from first support member 112. An end 116 of second support member 114 attaches to first support member 112 at a location along a longitudinal length of first support member 112 that is spaced inward from opposite ends 118 and 120 of first support member 112. Second support member 114 may be fixedly attached to first support member 112 using any of a variety of connection mechanisms, such as welding, brazing, bolting, screwing, as well others. First and second support members 112 and 114 together form a generally Y-shaped configuration. Strut tower brace 108 may be oriented such that an open end 122 of the Y-shaped brace, defined by end 120 of first support member 112 and an end 124 of second support member 114, is arranged outboard of a opposite closed end 124 adjacent end 118 of first support member 112, as viewed from the perspective of FIG. 2.

Strut tower brace 108 may be oriented such that first support member 112 extends substantially parallel to the ground surface, or alternatively may be arranged at a different orientation to accommodate the design and performance requirements of a particular application.

Strut tower brace 108 may be fixedly attached to forward interior wall 32 using one or more threaded fasteners 126. First support member 112 may include a pair of apertures 128 arranged proximate to ends 118 and 120 of the support member for receiving fasteners 126 used to attach strut tower brace 108 to front interior wall 32. A third aperture 128 may be provided in second support member 114 proximate to end 124 for receiving a third fastener 126 for attaching strut tower brace 108 to front interior wall 32. A total of three fasteners 126 are used in the exemplary configuration for attaching strut tower brace 108 to front interior wall 32, but alternatively a different number of fasteners may be employed. Strut tower brace 108 may alternatively be attached to front interior wall 32 using another connection mechanism, such as welding, brazing, rivets and screws, as well as others. Further, a combination of connection methods may be employed for connecting strut tower brace 108 to front interior wall 32.

First and second support members 112 and 114 may have a substantially flat contour or may include various bends to conform to a contour of front interior wall 32. For example, with particular reference to FIG. 4, first support member 112 may include a generally flat contour, whereas second support member 114 may in include a curved region 130 to enable second support member 114 to attach to a protruding region in front interior wall 32. It is not necessary that first support member 112 and second support member 114 be arranged entirely within a common plane, and one or more of the support members may include regions that do not reside on a common plane.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The foregoing description relates to what is presently considered to be the most practical embodiment. It is to be understood, however, that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle suspension strut tower bracing system comprising:
   a first suspension strut tower;
   a second suspension strut tower spaced apart from the first strut tower;
   at least one wall interconnecting the first strut tower to the second strut tower;
   at least one strut tower brace having a first end and a second end opposite the first end, the first and second ends fixedly attached to the at least one wall, wherein the entire at least one strut tower brace overlays the at least one wall and is spaced from the first and second strut towers;
   wherein the strut tower brace comprises:
   a first support member including the first end and the opposite second end; and
   a second support member having a first end fixedly attached to the first support member at location spaced inward from the first and second ends of the first support member, and a second end opposite the first end fixedly attached to the at least one wall.

2. The strut tower bracing system of claim 1, wherein the second support member is arranged at an oblique angle relative to the first support member.

3. The strut tower bracing system of claim 1, wherein the first support member is arranged substantially parallel to a ground surface.

4. The strut tower bracing system of claim 1, wherein the first and second support members generally form a Y-shaped configuration.

5. The strut tower bracing system of claim 4, wherein at least one of the at least one strut tower braces is positioned entirely between one of the first and second strut towers and a longitudinal center plane of the vehicle.

6. The strut tower bracing system of claim 5, wherein an open end of the at least one strut tower brace is positioned adjacent a strut tower and an opposite closed end is positioned adjacent the longitudinal center plane of the vehicle.

7. The strut tower bracing system of claim 5, wherein the at least one strut tower brace comprises a first strut tower brace arranged between the first strut tower and the longitudinal center plane of the vehicle, and a second strut tower brace arranged between the second strut tower and the longitudinal center plane of the vehicle, the first strut tower brace being spaced apart from the second strut tower brace.

8. The strut tower bracing system of claim 7, wherein a closed end of the first strut tower brace and a closed end of the second strut tower brace are positioned between an open end of the first strut tower brace and an open end of the second strut tower brace.

9. The strut tower bracing system of claim 8, wherein the open end of the first strut tower brace is spaced inward from the first strut tower and the open end of the second strut tower brace is space inward from the second strut tower.

10. A vehicle suspension strut tower bracing system comprising:
    a vehicle body having a wall connected to a first suspension strut and a second suspension strut;
    at least one strut tower brace attached to the wall, the at least one strut tower brace including a first support member having a first end and an opposite second end, and a second support member having a first end and an opposite second end, the first end of the second support member fixedly attached to the first support member at a location between the first and second ends of the first support member to form a Y-shaped configuration, wherein the at least one strut tower brace being attached to the wall only at the first and second ends of the first support member and the second end of the second support member.

11. The strut tower bracing system of claim 10, wherein a distance between the first end of the first support member and the second end of the second support member being less than a distance between the second end of the first support member and the second end of the second support member.

12. The strut tower bracing system of claim 11, wherein a distance between the first end of the first support member and the first suspension strut is less than a distance between the second end of the first support member and the first suspension strut.

13. The strut tower bracing system of claim 10, wherein the wall is disposed between a passenger compartment and a rear storage compartment of the vehicle.

14. The strut tower bracing system of claim 13, wherein the wall is fixedly attached to a first strut tower supporting the first suspension strut and a second strut tower supporting the second suspension strut.

15. The strut tower bracing system of claim 10, wherein the at least one strut tower brace comprises two strut tower braces arranged on opposite sides of a longitudinal center line of the vehicle.

16. The strut tower bracing system of claim 15, wherein the two strut tower braces are spaced apart from one another.

17. The strut tower bracing system of claim 10, wherein the second support member is oriented at an oblique angle relative to the first support member.

18. The strut tower bracing system of claim 1, wherein the at least one strut tower brace is fixedly attached to the at least one wall only at the first and second ends of the first support member and the second end of the second support member.

* * * * *

UNITED STATES PATENT AND TRADEMARK OFFICE
CERTIFICATE OF CORRECTION

| | |
|---|---|
| PATENT NO. | : 8,783,760 B2 |
| APPLICATION NO. | : 13/660070 |
| DATED | : July 22, 2014 |
| INVENTOR(S) | : George J. Van Kaam |

Page 1 of 1

It is certified that error appears in the above-identified patent and that said Letters Patent is hereby corrected as shown below:

In the Specification

In Column 1, line 6, please delete "consisting of a piston and" and replace with --consisting of a piston rod and--.

Signed and Sealed this
Sixteenth Day of December, 2014

Michelle K. Lee
*Deputy Director of the United States Patent and Trademark Office*